(12) United States Patent
Cholkeri et al.

(10) Patent No.: US 6,374,624 B1
(45) Date of Patent: Apr. 23, 2002

(54) ON/OFF SOLENOID EXPANSION DEVICE

(75) Inventors: Pandu Cholkeri, Worthington; William D. Kramer, Powell; Brian Enderle, Dublin, all of OH (US)

(73) Assignee: Ranco Incorporated, Plain City, OH (US)

( * ) Notice: Subject to any disclaimer, the term of this patent is extended or adjusted under 35 U.S.C. 154(b) by 0 days.

(21) Appl. No.: 09/520,083

(22) Filed: Mar. 8, 2000

(51) Int. Cl.$^7$ ................................................ F25B 41/04

(52) U.S. Cl. ...................................... 62/222; 251/129.21

(58) Field of Search ........................... 62/212, 511, 204, 62/205, 210, 211, 222, 223, 224, 225; 251/129.21, 129.22

(56) References Cited

U.S. PATENT DOCUMENTS

| | | | |
|---|---|---|---|
| 3,231,233 A | * | 1/1966 | Herion .................. 251/129.21 |
| 3,420,260 A | * | 1/1969 | Wisniewski ............ 251/129.21 |
| 3,462,116 A | * | 8/1969 | Wright, Jr. ............. 251/129.21 |
| 3,529,806 A | * | 9/1970 | Kozel ..................... 251/129.21 |
| 4,441,687 A | * | 4/1984 | Pauliukonis ........... 251/129.21 |
| 4,459,819 A | | 7/1984 | Hargraves |
| 5,715,704 A | | 2/1998 | Cholkeri et al. |

* cited by examiner

Primary Examiner—Harry B. Tanner
(74) Attorney, Agent, or Firm—Porter, Wright, Morris & Arthur

(57) ABSTRACT

A refrigerant flow-control valve operable between a no-flow condition and a flow condition in response to a control signal supplied thereto. The flow-control valve includes a tubular-shaped body forming a refrigerant passageway extending from an inlet to an outlet, a cylindrically-shaped restrictor secured within the tube and forming a restriction, and a cylindrically-shaped stop secured within the tube and forming a plunger valve flow passage. The stop is located downstream and spaced-apart from the restrictor and the restriction has a greater resistance to flow than the valve flow passage. A plunger is within the tube between the restrictor and the stop and carries a valve element. The plunger is movable between a first position closing the valve flow passage to generally prevent refrigerant flow therethrough and through the passageway and a second position opening the valve flow passage to permit refrigerant flow therethrough and through the passageway. A compression spring is within the tube between the restrictor and the plunger and resiliently urging the valve element into the first position. A solenoid coil located about the tube adjacent the plunger is adapted to selectively move the valve element to the second position in response to a control signal supplied thereto.

23 Claims, 2 Drawing Sheets

ON/OFF SOLENOID EXPANSION DEVICE

BACKGROUND OF THE INVENTION

The present invention generally relates to refrigeration systems and, more particularly, to refrigeration systems having flow-control restriction or expansion devices incorporated therein.

A refrigeration system, such as a motor vehicle air conditioner, typically has a closed circuit through which a refrigerant undergoes a thermodynamic cycle. The circuit of a motor vehicle air conditioner typically includes an engine driven semi-hermetic compressor, a condenser connected in series to the compressor, a flow-control restriction or expansion device, which is often referred to as a flow-control valve or expansion valve, connected in series to the condenser, and an evaporator connected in series between the expansion device and the compressor. The compressor raises the pressure of "low-pressure" gaseous refrigerant to a pressure suitable for operation of the condenser. "High-pressure hot" gaseous refrigerant passes from the compressor to the condenser. The condenser condenses the high-pressure hot refrigerant by transferring heat from the refrigerant to the ambient environment or atmosphere located outside the motor vehicle. The expansion device causes the high-pressure liquid refrigerant exiting the condenser to experience a sudden pressure drop, causing the liquid refrigerant to cool and expand (usually a constant enthalpy process). The "low-pressure cold" liquid refrigerant passes to the evaporator where it vaporizes by absorbing heat from surrounding air and as a result cools the surrounding air. Typically, a fan or blower forces air across the evaporator and delivers "cooled" air to a passenger compartment of the motor vehicle. Low-pressure hot gaseous refrigerant exits the evaporator and returns to the compressor and the above-described thermodynamic cycle repeats as the refrigerant flows through the circuit.

Such motor vehicle air conditioning systems can be easily tailored for efficient cooling at specific driving conditions such as, for example, highway driving (constant speed) or city driving (stop and go). When tailored for efficient cooling at one driving condition, however, cooling efficiency can be less than desirable while at other driving conditions. One solution has been to incorporate an expansion valve operable between two different flow conditions. For example, U.S. Pat. No. 5,715,704 to Cholkeri et al., which is expressly incorporated herein in its entirety by reference, discloses an electronically-controlled expansion valve. The expansion valve is a high/low stage direct controlled solenoid valve. The solenoid operates the expansion valve between a high-flow state providing high or maximum refrigerant flow through he expansion valve and a low-flow state providing low or minimum refrigerant flow through the expansion valve. The solenoid is periodically energized to obtain the low-flow and de-energized to obtain the high-flow state in response to refrigeration system parameters and/or motor vehicle parameters such as, for example, head pressure, vehicle speed and engine rpm to provide more efficient cooling at various driving conditions.

While refrigeration systems with such expansion valves are effective at providing more efficient cooling at multiple driving conditions, the expansion, refrigeration systems cooling more than one compartment have a need for even greater control of the flow through the expansion valve. Accordingly, there is a need in the art for an improved refrigeration system having a flow-control valve.

SUMMARY OF THE INVENTION

The present invention provides a refrigerant flow-control operable between a no-flow condition and a flow condition which overcomes at least some of the above-noted problems of the related art. According to the present invention, a flow control valve includes a body having an inlet and an outlet and forming a refrigerant passageway extending from the inlet to the outlet. The passageway has a restriction and a valve flow passage adapted such that refrigerant flows through the valve flow passage and the restriction generally in series. The restriction is located upstream from the valve flow passage. A valve element is within the body and movable between a first position closing the valve flow passage to generally prevent refrigerant flow therethrough and through the passageway and a second position opening the valve flow passage to permit refrigerant flow therethrough and through the passageway. A biasing member is within the body and resiliently urges the valve element into the first position. A valve actuator is adapted to selectively move the valve element to the second position in response to a control signal supplied thereto.

According to another aspect of the present invention, the present invention provides a refrigerant flow-control valve operable between a no-flow condition and a flow condition. The flow-control valve includes a tubular-shaped body having an inlet and an outlet and forming a refrigerant passageway extending from the inlet to the outlet, a cylindrically-shaped restrictor secured within the tube and forming a restriction, and a cylindrically-shaped stop secured within the tube and forming a valve flow passage. The stop is downstream and spaced-apart from the restrictor and the restriction has a greater resistance to flow than the valve flow passage. A plunger is within the tube between the restrictor and the stop and carries a valve element. The plunger is movable between a first position closing the valve flow passage to generally prevent refrigerant flow therethrough and through the passageway and a second position opening the valve flow passage to permit refrigerant flow therethrough and through the passageway. A biasing member is within the tube and resiliently urges the valve element into the first position. A valve actuator is adapted to selectively move the valve element to the second position in response to a control signal supplied thereto.

According to yet another aspect of the present invention, the present invention provides a refrigeration system. The refrigeration system has a compressor, a condenser, and an evaporator connected in series and an expansion valve connected in series between the condenser and the evaporator. The refrigeration system includes a body having an inlet and an outlet and forming a refrigerant passageway extending from the inlet to the outlet. The passageway has a restriction and a valve flow passage adapted such that refrigerant flows through the valve flow passage and the restriction generally in series. The restriction is located upstream from the valve flow passage. A valve element is within the body and movable between a first position closing the valve flow passage to generally prevent refrigerant flow therethrough and through the passageway and a second position opening the valve flow passage to permit refrigerant flow therethrough and through the passageway. A biasing member is within the body and resiliently urges the valve element into the first position. A valve actuator is adapted to selectively move the valve element to the second position in response to a control signal supplied thereto.

According to yet even another aspect of the present invention, the present invention provides a method of delivering refrigerant from a high pressure region to a low pressure region of a refrigeration system through a variable dimension passageway to expand the refrigerant as it enters the low pressure region. The method includes the steps of:

coupling the high and low pressure regions through a valve body having an inlet and an outlet and forming a refrigerant passageway extending from the inlet to the outlet. The passageway has a restriction and a valve flow passage downstream of the restriction and is adapted such that refrigerant flows through the valve flow passage generally in series with the restriction. A valve element is mounted within the valve body such that the valve element is movable between a first position closing the valve flow passage to generally prevent refrigerant flow therethrough and through the passageway and a second position opening the valve flow passage to permit refrigerant flow therethrough and through the passageway. The valve element is biased into the first position and is selectively moved to the second position by a valve actuator in response to a control signal supplied to the valve actuator.

BRIEF DESCRIPTION OF THE SEVERAL VIEWS OF THE DRAWING

These and further features of the present invention will be apparent with reference to the following description and drawing, wherein.

DETAILED DESCRIPTION OF PREFERRED EMBODIMENTS OF THE INVENTION

Figure 1:
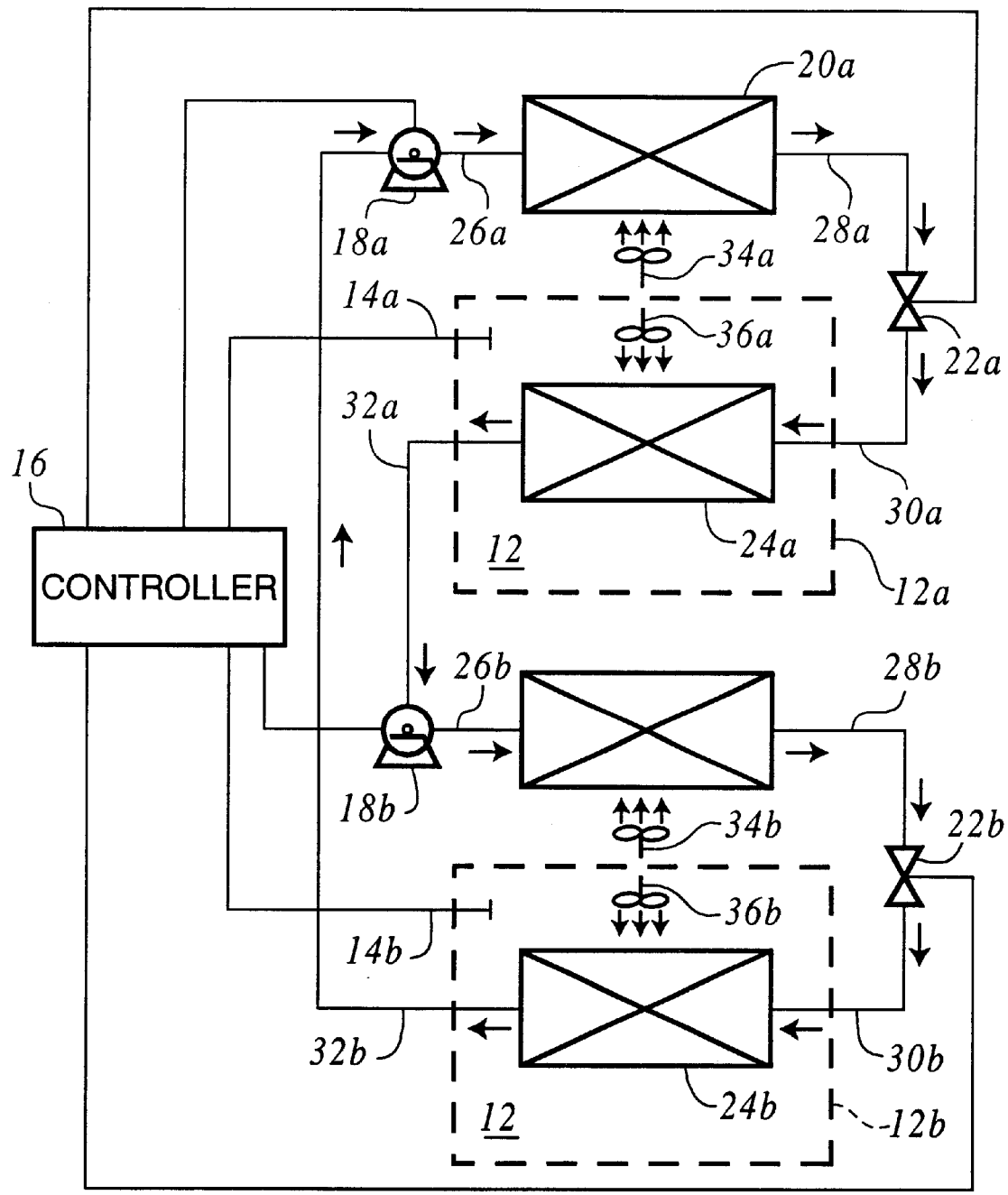
FIG. 1 is a schematic view of a refrigeration system having a refrigerant flow-control valve operable between a no-flow condition and a flow condition according to the present invention.

FIG. 1 schematically illustrates a vapor compression refrigeration system 10 according to the present invention such as, for example, a motor vehicle air conditioner. The motor vehicle refrigeration system 10 transfers heat from air to be directed into two portions 12a, 12b of an interior or passenger compartment 12 within the motor vehicle to ambient air or atmosphere outside the passenger compartment 12. Temperature sensors 14a, 14b can provide temperature signals to a controller 16 for controlling operation of the refrigeration system 10 to maintain the portions 12a, 12b of the passenger compartment 12 within desired temperature limits.

The refrigeration system 10 includes a closed or sealed circuit having two complete refrigeration cycles connected in series. Each refrigeration cycle includes a compressor 18a, 18b, a first heat exchanger or condenser 20a, 20b located downstream from the compressor 18a, 18b, a flow-control restriction device or expansion valve 22a, 22b located downstream from the condenser 20a, 20b, and a second heat exchanger or evaporator 24a, 24b located downstream from the expansion valve 22a, 22b. The evaporator 24a of the first refrigeration cycle is located upstream of the compressor 18b of the second refrigeration cycle and the evaporator 24b of the second refrigeration cycle is located upstream of the compressor 18a of the first refrigeration cycle. A first refrigerant line or conduit 26a, 26b connects a discharge or outlet port of the compressor 18a, 18b with an inlet port of the condenser 20a, 20b. A second refrigerant line or conduit 28a, 28b connects an outlet port of the condenser 20a, 20b with an inlet or upstream end of the expansion valve 22a, 22b. A third refrigerant line or conduit 30a, 30b connects an outlet or downstream end of the expansion valve 22a, 22b with an inlet port of the evaporator 24a, 24b. A fourth refrigerant line or conduit 32a, 32b connects an outlet port of the evaporator 24a, 24b with a suction or inlet port of the compressor 18a, 18b of the other refrigeration cycle. Assembled in this manner, the compressors 18a, 18b, the condensers 20a, 20b the expansion valves 22a, 22b, and the evaporators 24a, 24b of the two refrigeration cycles are connected in series by the refrigerant lines 26a, 26b, 28a, 29b, 30a, 30b, 32a, 32b. The refrigerant lines 26a, 26b, 28a, 29b, 30a, 30b, 32a, 32b can be formed of any suitable material known in the art and can be joined in any suitable manner known in the art.

A working fluid or refrigerant such as, for example, R134A goes through two complete thermodynamic cycles as it flows through the closed circuit. In each thermodynamic cycle the compressor 18a, 18b pressurizes the refrigerant and circulates the refrigerant through the circuit. Refrigerant exits the compressor 18a, 18b as a vapor at an elevated pressure. Preferably, refrigerant exits the compressor 18a, 18b at a pressure at or near an optimum pressure for operation of the condenser 20a, 20b but the pressure varies depending on the operating conditions of the motor vehicle. High-pressure refrigerant vapor passes through the first refrigerant line 26a, 26b from the compressor 18a, 18b to the condenser 20a, 20b. While passing through the condenser 20a, 20b, high-pressure refrigerant vapor transfers heat to a heat exchange medium such as, for example, air flowing over the condenser 20a, 20b. In a motor vehicle application, heat is transferred to ambient atmosphere located outside the passenger compartment 12a, 12b. Preferably, a blower or fan 34a, 34b forces air to flow over the condenser 20a, 20b. This transfer of heat within the condenser 20a, 20b causes refrigerant vapor to condense to liquid. The geometry of the refrigeration system 10 is preferably such that high-pressure refrigerant liquid, substantially at compressor discharge pressure, accumulates at a downstream end of the condenser 20a, 20b when the compressor 18a, 18b is operating. The condenser 20a, 20b continues to transfer heat from accumulated refrigerant liquid so that its temperature drops below the condensation temperature corresponding to the condenser pressure. This refrigerant condition is typically referred to as "subcooled" and the extent of subcooling depends on various operating conditions of the refrigeration system 10.

High-pressure refrigerant liquid exits the condenser 20a, 20b and flows through the second refrigerant line 28a, 28b to the expansion valve 22a, 22b. While passing through the expansion valve 22a, 22b, high-pressure refrigerant liquid flows through at least one restriction where it undergoes a pressure drop and may partially flash to vapor as it ideally expands and cools in a constant enthalpy process. Pressure of the refrigerant liquid is preferably reduced from at or near optimum condenser pressure at the inlet of the expansion valve 22a, 22b to at or near optimum evaporator pressure at the outlet of the expansion valve 22a, 22b. The expansion valve 22a, 22b automatically controls the flow rate of refrigerant from the condenser 20a, 20b to the evaporator 24a, 24b. The illustrated expansion valve 22a, 22b operates in either a flow condition (best shown in FIG. 2) or a no-flow condition (best shown in FIG. 3) as described in more detail hereinbelow.

Low-pressure refrigerant liquid-vapor mixture exits the expansion valve 22a, 22b and flows through the third refrigerant line 30a, 30b to the evaporator 24a, 24b. While passing through the evaporator 24a, 24b in a controlled manner, refrigerant is vaporized. Heat to support vaporization is absorbed from a heat exchange medium such as, for example, air flowing over the evaporator 24a, 24b so that the air is cooled. In a motor vehicle application, heat is transferred from air directed to the passenger compartment 12 so that air inside the passenger compartment 12 is cooled as desired. Preferably, a blower or fan 36a, 36b forces air across the evaporator 24a, 24b and delivers "cooled" air to the passenger compartment 12. Geometry of the refrigeration system 10 is such that low-pressure refrigerant vapor preferably accumulates at the downstream end of the evaporator 24a, 24b. The evaporator 24a, 24b continues to transfer heat to the refrigerant liquid so that its temperature rises above the vaporization temperature corresponding to the evaporator pressure. This refrigerant condition is typically referred to as "superheated" and the extent of superheating depends on various operating conditions of the refrigeration system 10.

Low-pressure refrigerant vapor exits the evaporator 24a, 24b and flows through the fourth refrigerant line 32a, 32b from the evaporator 24 to the compressor 18a, 18b of the other refrigeration cycle. In the compressor 18, refrigerant pressure is again elevated and the above-described thermodynamic cycle repeats as refrigerant continues to circulate through the circuit.

Figure 2:
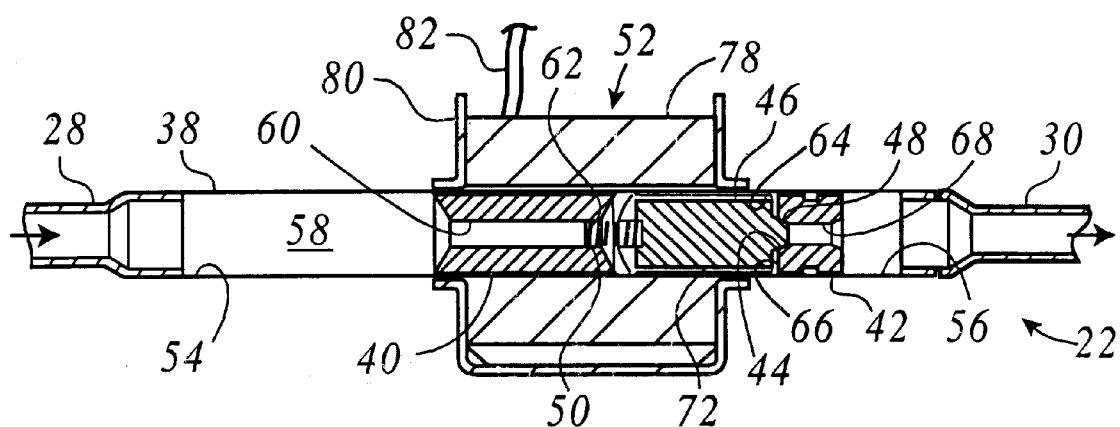
FIG. 2 is a cross-sectional view of the refrigerant-flow control valve of FIG. 1 showing the refrigerant flow-control valve in the no-flow condition.
Figure 3:
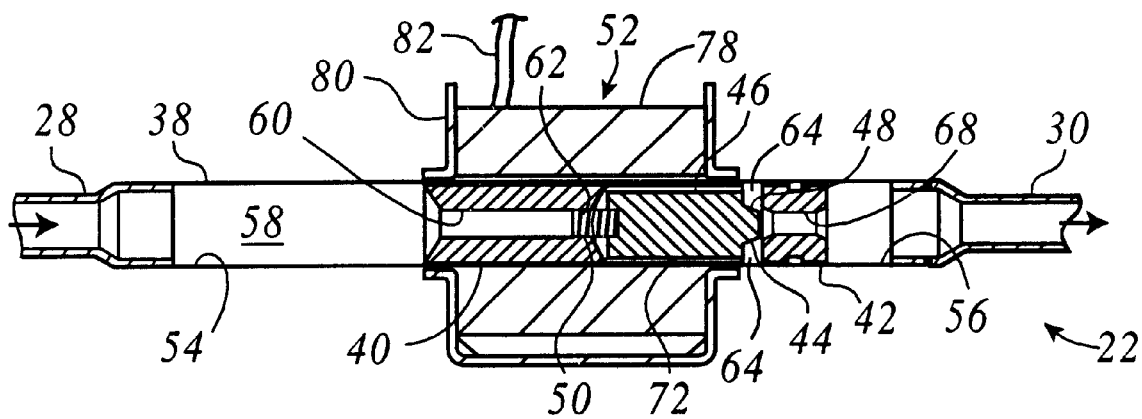
FIG. 3 is a cross-sectional view of the refrigerant flow-control valve of FIGS. 1 and 2 showing the refrigerant flow-control valve in the flow condition.

FIGS. 2 and 3 illustrate a preferred flow-control restriction or expansion valve 22 according to the present invention which is particularly adapted for use in a motor vehicle air conditioner. It is noted that each of the expansion valves 22a, 22b are preferably the same so only one will be described hereinbelow in detail. The expansion valve 22 includes a body 38, a restrictor 40, an end stop 42 forming a plunger valve seat 44, a movable plunger 46 carrying a plunger valve element 48, a plunger biasing member 50 for urging the plunger valve element 48 and the plunger valve seat 44 into engagement, and a valve actuator 52 to selectively move the plunger 46 to engage the plunger valve element 48 and the plunger valve seat 44.

The body 38 of the illustrated embodiment is a generally straight tube having a circular cross-section but it is noted that the body 38 can be in many other forms within the scope of the present invention, such as an angled tube, a machined housing, or any other suitable form. The body 38 includes a primary or inlet port 54 adapted for connection with the second refrigerant line 28 which delivers refrigerant from the condenser 20 to the expansion valve 22 and a secondary or outlet port 56 adapted for connection with the third refrigerant line 30 which delivers refrigerant from the expansion valve 22 to the evaporator 24. The refrigerant lines 28, 30 are sealingly connected to the inlet and outlet ports 54, 56 in any suitable manner. A passageway 58 extends through the body 38 and connects the inlet port 54 with the outlet port 56 for refrigerant flow therebetween. The body 38 can be formed of any suitable material known to those skilled in the art.

The restrictor 40 is located within the passageway 58 of the body 38 and is generally cylindrically-shaped having an outer surface sized for cooperation with the passageway 58 of the body 38. The outer surface of the restrictor 40 is preferably sized for a "tight" or "interference" fit with the body passageway 58 in a "plug-like" manner for both securing the restrictor 40 in a fixed position within the passageway 58 to prevent relative movement therebetween and sealing the outer surface of the restrictor 40 and the inner surface of the body passageway 58 to prevent refrigerant flow therebetween. It is noted that the restrictor 40 can be secured to the body in additional or other manners such as by, for example, brazing, welding, crimping, mechanically or chemically fastening, or the like and can be sealed using sealants, seals, gaskets or the like. In the illustrated embodiment, the restrictor 40 is generally located near the center of the body 38, upstream of the plunger 46 and the end stop 42. The restrictor 40 forms a first flow passage that is an orifice or restriction 60 that axially extends through the restrictor 40 and is generally coaxial with the passageway 58. The restriction 60 is sized and shaped to restrict and control refrigerant flow through the passageway 58 of the body 38 as described in more detail hereinbelow. The entrance and exit of the restriction 60 are preferably expanded such as, for example, by countersinks to improve flow into and out of the restriction 60. The downstream end of the restrictor 40 is preferably provided with a seat 62 for cooperating with the plunger biasing member 50. The illustrated restrictor 40 is provided with a central recess at its downstream end to form the seat 62 which is sized and shaped for receiving and/or supporting an end of the plunger biasing member 50. In the illustrated embodiment the restriction 60 and the plunger biasing member seat 62 are coaxially formed by the restrictor 40. The restrictor 40 can be formed of any suitable material known to those skilled in the art.

The end stop 42 is located within the passageway 58 of the body 38 and is generally cylindrically-shaped having an outer surface sized for cooperation with the passageway 58 of the body 38. The outer surface of the end stop 42 is preferably sized for a "tight" or "interference" fit with the body passageway 58 in a "plug-like" manner for both securing the end stop 42 in a fixed position within the passageway 58 to prevent relative movement therebetween and sealing the outer surface of the end stop 42 and the inner surface of the body passageway 58 to prevent refrigerant flow therebetween. It is noted that the end stop 42 can be secured to the body in additional or other manners such as by, for example, brazing, welding, crimping, mechanically or chemically fastening, or the like and can be sealed using sealants, seals, gaskets or the like. In the illustrated embodiment, the end stop 42 is located near the outlet port 56 and downstream of the plunger 46. The end stop 42 is spaced apart from the downstream end of the restrictor 40 to form a chamber 64 therebetween within the body passageway 58. The end stop 42 forms an abutment 66 facing the plunger 46 and the restrictor 40 which provides an outer limit for movement of the plunger 46 away from the restrictor 40. It is noted that the abutment 66 can be formed in other manners such as, for example, crimping the body 38. The end stop 42 is provided with an axially extending plunger valve flow passage 68 which is generally coaxial with the body passageway 58 for passage of refrigerant therethrough. The entrance or down stream end of the plunger-valve passage forms the plunger valve seat 48. The exit or downstream end of the plunger valve flow passage 68 is preferably expanded such as, for example, by countersink to improve flow out of the plunger-valve flow passage 68. The end stop 42 can be formed of any suitable material known to those skilled in the art.

Figure 4:
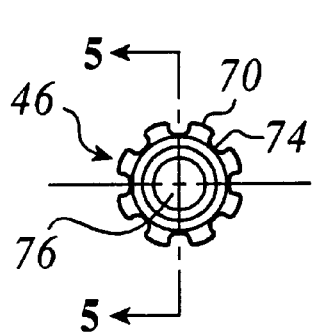
FIG. 4 is an end view of a plunger of the flow-control valve of FIGS. 1–3 showing the upstream end of the plunger.
Figure 5:
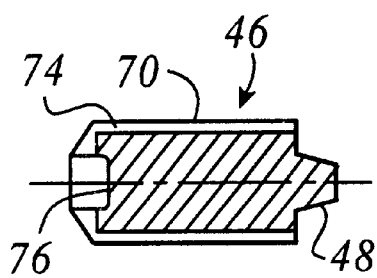
FIG. 5 is a cross-sectional view of the plunger taken along line 5—5 of FIG. 4.
Figure 6:
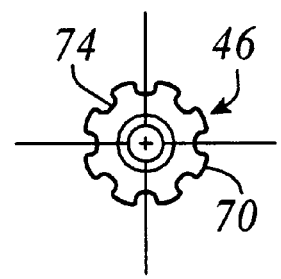
FIG. 6 is an end view of the plunger of FIGS. 4 and 5 showing the downstream end of the plunger.

The plunger 46 is located within the body passageway 58 generally near the outlet port 56 and between the restrictor 40 and the end stop 42. The plunger 46 is adapted for controlled axial movement within the passageway 58 between the restrictor 40 and the end stop 42 and relative to the body 38, the restrictor 40, and the end stop 42. As best shown in FIGS. 4–6, the plunger 46 has a generally cylindrically-shaped bearing surface 70 for supporting the plunger 46 at its outer periphery which is sized and shaped for a close fit and axial movement within the body passageway 58. The bearing surface 70 is adapted to form a flow passage 72 past the plunger 46 which preferably includes a plurality of axially extending flow paths to permit refrigerant flow between the circumference of the plunger 46 and the inner surface of the body passageway 58 past the entire axial length of the bearing surface 70. In this regard, the illustrated bearing surface 70 is provided with a plurality of circumferentially spaced-apart flutes or open channels 74 which extend the full axial length of the bearing surface 70. It is noted that the plunger 46 can be adapted to form the flow passage 72 in other manners such as, for example, a plurality of flat sections or holes.

The plunger valve element 48 is formed at the downstream end of the plunger 46, that is the end facing the end stop 42, and is sized and shaped to cooperate with the plunger valve seat 44 of the end stop 42 to sealingly close a plunger-valve flow passage 68 to prevent refrigerant flow therethrough when the plunger valve element 48 engages the plunger valve seat 44. The illustrated plunger valve element 48 includes a generally frusto-conically-shaped surface at the downstream end of the plunger 46 which is sized for engaging a cooperating frusto-conically-shaped surface of the plunger valve seat 44. The surface is preferably formed by a frusto-conically-shaped protrusion axially extending from the plunger 46. It is noted that the cooperating plunger valve seat 44 and the plunger valve element 48 can take other forms within the scope of the present invention. It is also noted that the expansion valve 22 can be alternatively designed such that the plunger 46 carries the plunger valve seat 44 and the end stop 42 forms the plunger valve element 48.

The upstream end of the plunger 46 is preferably provided with a seat 76 for cooperating with the plunger biasing member 50. The illustrated plunger 46 is provided with a recess at its upstream end to form the seat 76 which is sized and shaped for receiving and/or supporting an end of the plunger biasing member 50. The plunger 46 can be formed of a suitable ferrro-magnetic material which cooperates with the valve actuator 52 as described hereinbelow such as, for example, 430 stainless steel.

The illustrated plunger biasing member 50 is located within the body passageway 58 between and engaging the restrictor 40 and the plunger 46. The plunger biasing member 50 is adapted for resiliently biasing or urging the plunger 46 in a downstream direction toward the end stop 42, that is, away from the restrictor 40, to engage the plunger valve seat 44 and the plunger valve element 48 and close the plunger-valve flow passage 68. The plunger biasing member 50 is preferably a helical coil compression spring but other types biasing means and/or springs can be utilized within the scope of the present invention such as, for example, tension springs, leaf springs, fluid springs, and the like. The plunger biasing member 50 is sized to seat the plunger valve element 46 when the valve actuator 52 is de-energized but to allow the valve actuator 52 to move the plunger 46 and seat the plunger valve element 48 when valve actuator 52 is energized.

The valve actuator 52 is preferably a solenoid coil 78 supported in a ferromagnetic coil frame 80. The solenoid coil 78 is secured about the body 38 adjacent the plunger 46 so that the solenoid coil 78 cooperates with the plunger 46 to selectively move the plunger 46 against the biasing action of the plunger biasing member 50. The solenoid coil 78 can be a commercially available solenoid which preferably accepts direct current (d.c.) input signals between 9 and 16 volts and draws no more than about 1 ampere of current while moving the plunger 44 to seat the plunger valve element 46. Other suitable solenoids coils 78 can utilized such as, for example, those using alternating current (a.c.) current signals.

The valve actuator 52 preferably has a control-signal input 82 which receives an externally generated control signal from the controller 16 to initiate movement of the plunger 46 to a position for limiting or restricting refrigerant flow through the passageway 58. The illustrated solenoid coil 78 is electrically coupled to the controller 16 which selectively energizes the solenoid coil 78 to set up a magnetic field in the region of the plunger 46 and move the plunger 46 in an upstream direction toward the restrictor 40 and away from the end stop 42. When the solenoid coil 78 is de-energized, the magnetic field is removed and the plunger biasing member 50 moves the plunger 46 in a downstream direction away from the restrictor 40 and toward the end stop 42. Thus, the illustrated expansion valve 22 requires no control signal to the valve actuator 52 for the expansion valve 22 to be in the no-flow condition but requires a control signal to the valve actuator 52 for the expansion valve 22 to be in the flow condition. It is noted that the valve actuator 52 can be alternatively designed to receive a control signal to initiate movement of the plunger 46 to a block refrigerant flow through the passageway so that a control signal is sent to the valve actuator 52 for the expansion valve 22 to be in the no-flow condition but not the flow condition.

The control signal can be pulse width modulated so that the plunger 46 moves back and forth at the frequency of the pulse width modulated control signal. In such a system, greater control over refrigerant flow is maintained. For example, if the frequency is 8 hertz and the duty cycle is 50%, the plunger 46 moves back and forth 8 times a second and reduce the effective flow area to a value between the no-flow and full flow conditions (the minimum and maximum flow values). To increase the refrigerant flow, the duty cycle is increased so that the plunger 46 is in the retracted or second position for greater than 50% of the time and therefore blocks the plunger valve flow passage 68 less than 50% of the time.

The controller 16 preferably responds to sensed conditions or parameters of the motor vehicle or the refrigeration system 10 to automatically activate the valve actuator 52 with a control signal and move the position of the plunger 46. Monitored parameters input to the controller 16 can be, for example, engine speed, motor vehicle speed, compressor head pressure, or any other condition which indicates the refrigerant flow rate should be adjusted. By way of example, engine speed can indicate a need to adjust refrigerant flow rate because compressor speed is reduced at low engine speed. Low compressor speed results in a lower pressure head of refrigerant entering the compressor 18. Reducing refrigerant flow rate through the expansion valve 22 can increase this pressure head. Thus, the expansion valve 22 is advantageously adjusted for lower refrigerant flow rate below a threshold value of engine speed such as, for example, below about 850–900 rpm.

During operation of the refrigeration system 10, the expansion valve 22 is in the no-flow condition when the solenoid coil 78 is de-energized. As best shown in FIG. 2, the expansion valve 22 is in the no-flow condition because the plunger biasing member 50 urges the plunger 46 in an upstream direction to engage the valve element 48 against the valve seat 44 and close the plunger-valve flow passage 68. The expansion valve 22 is in the flow condition when the solenoid coil is energized. As best shown in FIG. 3, the expansion valve is in the flow condition because the solenoid coil 78 moves the plunger 46 against the bias of the plunger biasing member 50 to disengage the valve element 48 from the valve seat 44 and open the plunger-valve flow passage 68. When the expansion valve 22 is in this flow-condition, refrigerant enters the expansion valve 22 through the inlet port 54 and successively flows through the restriction 60 formed by the restrictor 40, the chamber 64 located between the restrictor 40 and the end stop 42, and the plunger-valve flow passage 68 formed by the end stop to the outlet port 56 of the expansion valve 22. While in this flow condition, refrigerant flow is controlled by the restriction 60 because the restriction 60 is sized to have a greater resistance to refrigerant flow than the plunger valve flow passage 68. The restriction 60 is sized as required for the particular refrigeration system 10.

It is apparent from the above description that the expansion valve 22 is automatically operable between two flow conditions: (1) the no-flow condition, wherein the valve element 48 is in a first or closed position so that there is no refrigerant flow through the expansion valve 22; and (2) the flow condition, wherein the valve element 48 is in a second or open position so that the restriction 60 controls refrigerant flow through the expansion valve 22. It is noted that operation of the expansion valve 22 between the two flow conditions is automatically controlled by the controller 16.

Although particular embodiments of the present invention have been described in detail, it will be understood that the present invention is not limited correspondingly in scope, but includes all changes and modifications coming within the spirit and terms of the claims.

What is claimed is:

1. A refrigerant flow-control valve operable between a no-flow condition and a flow condition, said valve comprising:
   a body having an inlet and an outlet and forming a refrigerant passageway extending from said inlet to said outlet, said passageway having a restriction and a valve flow passage adapted such that refrigerant flows through said valve flow passage and said restriction generally in series, said restriction located upstream from said valve flow passage;
   a restrictor located within the passageway of the body and forming the restriction, said restriction axially extending entirely through the restrictor and generally coaxial with the passageway, said restrictor being separate from the body and secured to the body to prevent movement relative to the body, said restrictor having an outer surface sealingly engaging the body to prevent refrigerant flow therebetween;
   a stop located entirely within the passageway of the body and forming the valve flow passage, said stop being spaced apart and downstream from the restrictor, said stop being separate from the body and secured to the body to prevent movement relative to the body, said stop having an outer surface sealingly engaging the body to prevent refrigerant flow therebetween;
   wherein said refrigerant passage has a generally constant diameter from an inlet of the restrictor to an outlet of the stop;
   a valve element within said body and movable between a first position closing said valve flow passage to generally prevent refrigerant flow therethrough and through said passageway and a second position opening said valve flow passage to permit refrigerant flow therethrough and through said passageway;
   a plunger carrying said valve element and movable between said restrictor and said stop;
   a biasing member within said body and resiliently urging said valve element into said first position; and
   a valve actuator adapted to selectively move said valve element to said second position in response to a control signal supplied thereto.

2. A refrigerant flow-control valve according to claim 1, wherein said restriction is adapted to have a higher resistance to refrigerant flow than said valve flow passage.

3. A refrigerant flow-control valve according to claim 1, wherein said biasing member is compression spring.

4. A refrigerant flow-control valve according to claim 1, wherein said valve actuator is a solenoid coil.

5. A refrigerant flow-control valve according to claim 1, wherein said valve element is formed by a frusto-conically-shaped protrusion extending from a downstream end of said plunger.

6. A refrigerant flow-control valve according to claim 1, wherein an outer periphery of said plunger is adapted for passage of refrigerant past said plunger along said outer periphery.

7. A refrigerant flow-control valve according to claim 1, wherein said biasing member is a compression spring having one end seated against said restrictor and another end seated against said plunger.

8. A refrigerant flow-control valve according to claim 1, wherein said passageway is generally circular in cross-section, said plunger has a generally cylindrically-shaped bearing surface adapted to cooperate with said passageway, and said bearing surface is adapted to form a flow path to permit refrigerant past the plunger.

9. A refrigerant flow-control valve according to claim 8, wherein said flow path is formed by a plurality of axially extending and circumferentially spaced apart channels formed in said bearing surface.

10. A refrigerant flow-control valve according to claim 1, wherein said body is a generally straight tube with said inlet at one end and said outlet at an opposite end.

11. A refrigerant flow-control valve according to claim 1, wherein said body is a generally straight tube with said inlet at one end and said outlet at an opposite end, said restrictor is cylindrically-shaped, said stop is cylindrically-shaped, and said tube has a constant diameter from the inlet end of the restrictor to the outlet end of the stop.

12. A refrigerant flow-control valve according to claim 4, wherein said solenoid coil is secured about the body adjacent the restrictor and the plunger and longitudinally spaced from the stop.

13. A refrigerant flow-control valve according to claim 12, wherein a length of the restrictor is generally equal to a length of the plunger.

14. A refrigerant flow-control valve according to claim 4, wherein said restrictor extends to a longitudinal center of the solenoid coil.

15. A refrigerant flow-control valve operable between a no-flow condition and a flow condition, said valve comprising:
   a tube having an inlet and an outlet and forming a refrigerant passageway extending from said inlet to said outlet;

a cylindrically-shaped restrictor separate of said tube and secured within said tube to prevent movement relative to the tube, said restrictor forming a restriction axially extending entirely through the restrictor and generally coaxial with the passageway, said restrictor having an outer surface sealingly engaging the tube to prevent refrigerant flow therebetween;

a cylindrically-shaped stop separate from the tube and secured within said tube to prevent movement relative to the tube, said stop forming a valve flow passage, said stop being downstream and spaced-apart from said restrictor; said restriction having a greater resistance to flow than said valve flow passage, said stop having an outer surface sealingly engaging the tube to prevent refrigerant flow therebetween;

wherein said tube has a constant diameter from an inlet end of the restrictor to an outlet end of the stop;

a plunger within said tube between said restrictor and said stop and carrying a valve element, said plunger movable between a first position closing said valve flow passage to generally prevent refrigerant flow therethrough and through said passageway and a second position opening said valve flow passage to permit refrigerant flow therethrough and through said passageway;

a biasing member within said tube and resiliently urging said valve element into said first position; and a valve actuator adapted to selectively move said valve element to said second position in response to a control signal supplied thereto.

16. A refrigerant flow-control valve according to claim 15, wherein said biasing member is compression spring located within said tube and having one end seated against said restrictor and another end seated against said plunger.

17. A refrigerant flow-control valve according to claim 15, wherein said valve actuator includes a solenoid coil located about said tube adjacent said plunger.

18. A refrigerant flow-control valve according to claim 15, wherein an outer periphery of said plunger is adapted for passage of refrigerant between said tube and said outer periphery.

19. A refrigeration system having a compressor, a condenser, and an evaporator connected in series and an expansion valve connected in series between the condenser and the evaporator, said refrigeration system comprising:

a body having an inlet and an outlet and forming a refrigerant passageway extending from said inlet to said outlet, said passageway having a restriction and a valve flow passage adapted such that refrigerant flows through said valve flow passage and said restriction generally in series, said restriction located upstream from said valve flow passage;

a restrictor located within the passageway of the body and forming the restriction, said restriction axially extending entirely through the restrictor and generally coaxial with the passageway, said restrictor being separate from the body and secured to the body to prevent movement relative to the body, said restrictor having an outer surface sealingly engaging the body to prevent refrigerant flow therebetween;

a stop located entirely within the passageway of the body and forming the valve flow passage, said stop being spaced apart and downstream from the restrictor, said stop being separate from the body and secured to the body to prevent movement relative to the body, said stop having an outer surface sealingly engaging the body to prevent refrigerant flow therebetween;

wherein said refrigerant passage has a generally constant diameter from an inlet of the restrictor to an outlet of the stop;

a valve element within said body and movable between a first position closing said valve flow passage to generally prevent refrigerant flow therethrough and through said passageway and a second position opening said valve flow passage to permit refrigerant flow therethrough and through said passageway;

a plunger carrying said valve element and movable between said restrictor and said stop;

a biasing member within said body and resiliently urging said valve element into said first position; and a valve actuator adapted to selectively move said valve element to said second position in response to a control signal supplied thereto.

20. A refrigerant flow-control valve according to claim 19, wherein said valve actuator is a solenoid coil and said solenoid coil is secured about the body adjacent the restrictor and the plunger and longitudinally spaced from the stop.

21. A refrigerant flow-control valve according to claim 20, wherein a length of the restrictor is generally equal to a length of the plunger.

22. A refrigerant flow-control valve according to claim 19, wherein said valve actuator is a solenoid coil and said restrictor extends to a longitudinal center of the solenoid coil.

23. A method of delivering refrigerant from a high pressure region to a low pressure region of a refrigeration system through a variable dimension passageway to expand the refrigerant as it enters the low pressure region, said method comprising the steps of:

(a) coupling the high and low pressure regions through a valve body having an inlet and an outlet and forming a refrigerant passageway extending from the inlet to the outlet, the passageway having a restriction and a valve flow passage downstream of the restriction and adapted such that refrigerant flows through the valve flow passage generally in series with the restriction;

(b) mounting a restrictor, separate from the body, within the passageway of the body to form the restriction such that the restrictor is secured to the body to prevent movement relative to the body and the restrictor sealingly engages the body to prevent refrigerant flow therebetween;

(c) providing a restriction which axially extends entirely through the restrictor and generally coaxial with the passageway;

(d) mounting a stop, separate from the body, within the passageway to form the valve such that the stop is spaced apart and downstream from the restrictor, secured to the body to prevent movement relative to the body, and sealingly engaging the body to prevent refrigerant flow therebetween;

(e) providing the refrigerant passage with a generally constant diameter from an inlet of the restrictor to an outlet of the stop;

(f) mounting a valve element within the valve body such that the valve element is movable between a first position closing the valve flow passage to generally prevent refrigerant flow therethrough and through the passageway and a second position opening the valve flow passage to permit refrigerant flow therethrough and through the passageway;

(g) biasing the valve element into the first position; and (h) selectively moving the valve element to the second position with a valve actuator in response to a control signal supplied to the valve actuator.

* * * * *